United States Patent [19]

Faure et al.

[11] Patent Number: 4,465,325

[45] Date of Patent: Aug. 14, 1984

[54] DEVICE FOR HANDLING A LOAD

[75] Inventors: Michel Faure, Igny; Jean-Louis Poinssot, Palaiseau, both of France

[73] Assignee: Commissariat a l'Energie Atomique, Paris, France

[21] Appl. No.: 415,348

[22] Filed: Sep. 7, 1982

[30] Foreign Application Priority Data

Sep. 10, 1981 [FR] France .................................. 81 17150

[51] Int. Cl.³ ........................ F16C 32/06; G21C 19/00
[52] U.S. Cl. .................................... 308/5 R; 376/268; 376/269
[58] Field of Search ................. 308/3 R, 5 R; 384/99, 384/100, 111, 114, 118; 376/268, 269, 270, 271, 261, 206, 264, 460, 365

[56] References Cited

U.S. PATENT DOCUMENTS

| 3,635,532 | 1/1972 | Zerbola | 308/5 R |
| 3,697,142 | 10/1972 | Fortier | 384/99 X |
| 3,781,069 | 12/1973 | Gluchowicz | 308/5 R |
| 4,035,037 | 7/1977 | Cunningham | 308/5 R |
| 4,095,079 | 6/1978 | Ullmann et al. | 308/6 R X |
| 4,226,483 | 10/1980 | Yamamoto | 308/9 |

FOREIGN PATENT DOCUMENTS 2124797 12/1971 Fed. Rep. of Germany .
2135833 12/1972 France .

Primary Examiner—Stuart S. Levy
Assistant Examiner—David Werner
Attorney, Agent, or Firm—Pearne, Gordon, Sessions, McCoy, Granger & Tilberry

[57] ABSTRACT

The present invention relates to a device for handling a load, particularly an immersed load, by means of a shaft having a polygonal cross-section.

The shaft, which can move along its axis, is maintained by a bearing connected to rotation means, so that a rotation of the bearing about the axis of the shaft leads to an identical rotation of the latter. The supply fluid for the bearing can be that in which the load to be manipulated is immersed.

Application to the control and inspection of fuel rods.

3 Claims, 3 Drawing Figures

DEVICE FOR HANDLING A LOAD

BACKGROUND OF THE INVENTION

The present invention relates to a device for handling a load, particularly a load immersed in a liquid, by means of a shaft having a polygonal cross-section permitting both a precise angular positioning of the shaft and a displacement thereof along its axis without vibration.

Countries having nuclear power stations for the generation of electricity are attempting to obtain the lowest possible kWh costs. For this purpose, the fuels must be used to a maximum. The non-destructive inspection and control of the development of the health of the canning of said fuel makes it possible to decide whether their use can be continued. It is advantageous to be able to carry out this control on site. The irradiated fuel elements are stored in ponds, the water ensuring the biological protection and heat exchange of the residual power. The inspection of a rod requires it to pass in front of sensors, whilst remaining immersed. The investigation of incipient faults requires high sensitivity levels on the part of the detection equipment. The knowledge of the position of the faults requires not only a passage, but also a rotation of the rod.

At present, shafts are guided in several different ways in the devices used for handling fuel elements. It is possible to use two parallel cylindrical guides along which travels a connection mechanism fixed to the shaft. Other systems use one or two guides provided with a longitudinal groove, in which travels a key, which is fixed to the shaft. The guide bars can also be in the form of grooved shafts permitting the sliding of a member connected rigidly to the shaft, said member being provided with grooves which cooperate with those of the guide bar. It is also possible to use slide guides in various forms, along which travel members integral with the shaft. All these systems can be equipped with ball bearings or ball guides. However, these devices have the disadvantage of not permitting a random orientation of the shaft relative to a fixed chassis.

BRIEF SUMMARY OF THE INVENTION

The present invention aims at obviating this disadvantage by proposing a device in which the fuel rod is integral with an elevator, which can rotate about its vertical axis. This elevator must be free from all vibrations, because the latter constitute a background noise for the sensors. In addition, it must have a very considerable rigidity and a zero angular clearance. This is not possible with the conventional devices referred to hereinbefore, which are difficult to use when immersed, particularly in demineralized water and under gamma radiation.

The materials usable under such conditions have very similar characteristics and there is a by no means negligible risk of seizing.

The present invention solves this problem by means of a device which makes it possible on the one hand for there to be a longitudinal displacement of the shaft without friction and vibration as a result of a fluid guide bearing and on the other the orientation of the bearing - shaft assembly relative to a fixed chassis.

According to the main feature of the device according to the invention, which is of the type having means for the translation of the shaft along its axis, said translation means comprise a fluid guide bearing, the latter being connected to rotation means in order that a rotation of the bearing about the axis of the shaft leads to an identical rotation of said shaft.

In its most general sense, the word "cylinder" designates a solid produced by a straight line moving parallel to itself, along a random line and whereof certain parts can be curved and whereof other parts are constituted by straight line segments. On the basis of this definition, a shaft having a polygonal section can be considered as a special case of a cylindrical shaft. It is for this reason that it is stated that the invention can apply to any random polygonal or cylindrical shaft, provided that it has at least one planar face. A shaft, whose cross-section is a semicircle can be looked upon as a cylindrical shaft having a planar face parallel to its generator.

According to another feature of the invention, the said shaft has at least two parallel planar faces, and the said bearing has, facing each of the two aforementioned planar faces, two distribution chambers into each of which issues a pressurized fluid intake, each of the latter being equipped with an individual pressure regulation facility.

The fact that there is an individual pressure regulation facility for each fluid intake makes it possible to regulate the fluid in each of the two chambers positioned facing one face of the shaft and to maintain it constant throughout the operating period of the apparatus. Therefore, if the shaft undergoes an accidental angular deflection, it compresses the fluid cushion corresponding to one of the two distribution chambers, whilst the fluid cushion corresponding to the other chamber is subject to a pressure drop. Therefore, a torque is exerted on the two opposite planar faces of the shaft and the latter is automatically brought into its initial position.

According to another feature of the device according to the invention, the bearing has facing at least one planar face of the shaft, a first and a second group of two distribution chambers into each of which issues a pressurized fluid intake, each of the latter being provided with an individual pressure regulating facility, the first group being spaced from the second group along the axis of the shaft and the two groups being mechanically interconnected.

Finally, the invention also relates to an application of the device according to the invention to the handling of a load immersed in a liquid. In this case, the said liquid is used as the supply fluid for the guide bearing.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
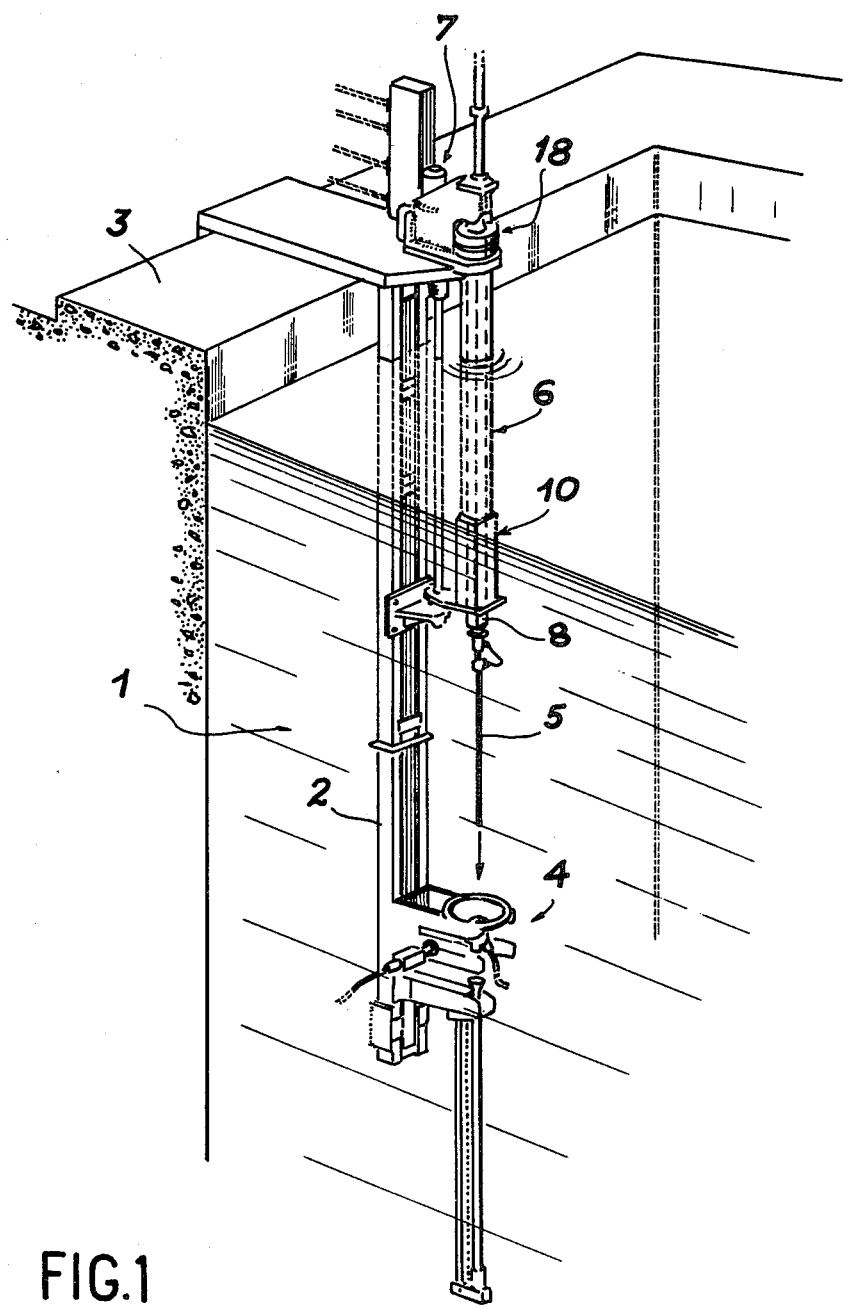
FIG. 1 a diagrammatic perspective view of the device according to the invention.

FIG. 1 shows the complete device according to the invention, which is given the reference numeral 1. The latter essentially comprises a vertical support 2, largely immersed in the water of a storage pond and fixed to the curb 3 of the latter. To the lower part of support 2 is fixed a control device 4, e.g. an eddy current device, in front of which travels a fuel rod 5. The latter is mounted on the lower end of a shaft 8 having a polygonal cross-section which, in the preferred embodiment described here, has a square cross-section. Shaft 8 travels longitudinally within the suspension tube 6 and is maintained by a fluid guide bearing 10 connected to support 2. The translational movements of shaft 8 are obtained as a result of a not shown chain, placed within tube 6 and connected to a translation motor 7. Bearing 10 is fixed to suspension tube 6, which is itself connected to rotation means, in the present case a rotary plate 18. It is obvious that the movements of the latter bring about a rotation of bearing 10 via tube 6 and consequently a corresponding rotation of shaft 8. Thus, it is possible to determine the angular position of fuel rod 5 before moving it in front of control device 4 and performing said control in accordance with several successive generatrixes. In the presently described embodiment where the fuel rod 5 is immersed in the water of a pond, motors 7 and 18 are located out of the liquid mass and the water of this pond is used as the supply fluid for bearing 10. As a result of the latter, the translational movements of shaft 8 can take place substantially without friction and vibration and the immobilization in rotation of the shaft relative to the bearing is ensured by the polygonal shape of said two members.

Figure 2:
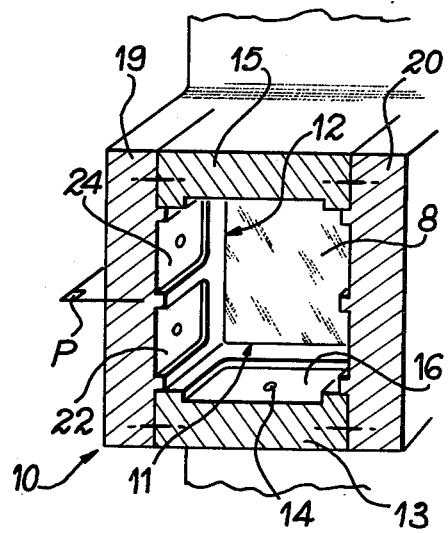
FIG. 2 a diagrammatic perspective and part sectional view of one end of the guide bearing used in the device of FIG. 1.

FIG. 2 shows in greater detail one end of a shaft, such as 10 used in the present invention. It is possible to see that, in the special case described here, shaft 8 has a square cross-section, which consequently defines four planar faces, whereof one, to the left in the drawing, is designated by reference numeral 12. The bearing is constituted by four plates such as 13, each having in per se known manner a pressurized fluid inlet 14 issuing into a space 16 called the "distribution chamber". In the present case, plate 13 and the facing plate 15 only have, at their end visible in the drawing, a single distribution chamber 16 facing the corresponding face of shaft 8. Distribution chamber 16 occupies almost the entire width of plate 13, whilst opening 14 is positioned in the centre of chamber 16, i.e. substantially in the plane of symmetry of face 11 of shaft 8 facing plate 13.

However, plates 19 and 20 facing the two other faces of shaft 8, have at their end two distribution chambers. This is the case with chambers 22 and 24 located at the end of plate 19 facing face 12 of shaft 8. FIG. 2 also shows that the distribution chambers 22, 24 are positioned on either side of the plane of symmetry P of face 12, said plane being perpendicular to face 12 and passes through the axis of shaft 8.

Figure 3:
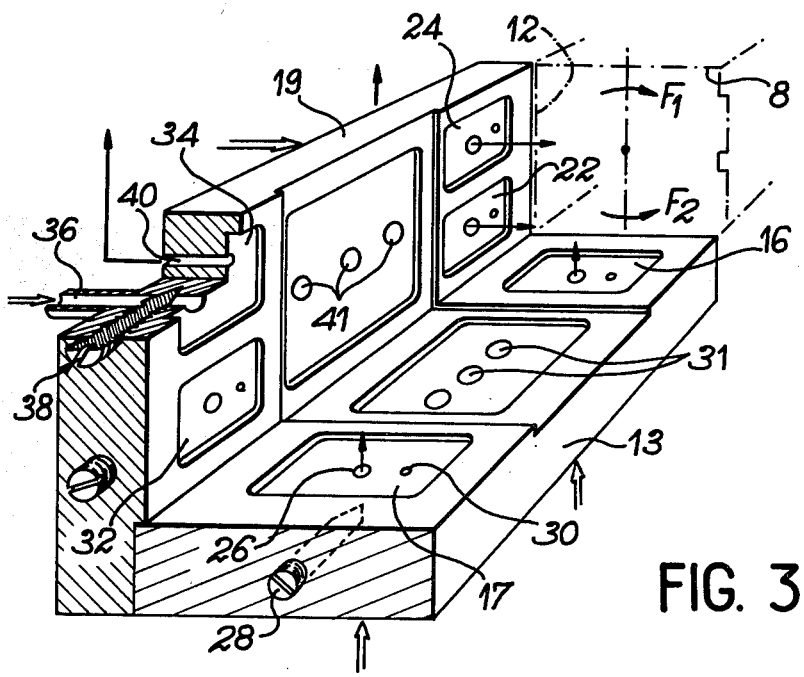
FIG. 3 a diagrammatic perspectiv view, which is partly broken away, of the plates used for the construction of the bearing of FIG. 2.

The constitution of plates 19 and 13, as well as the function of distribution chambers 22 and 24 will now be described in greater detail in FIG. 3. It can be seen that plate 13 has at each of its ends a single distribution chamber such as 16 or 17. A fluid inlet 26 provided with a pressure regulating screw 28 issues into the centre of distribution chamber 17. An opening 30 within distribution chamber 17 makes it possible to connect a pressure inlet, in order to check the pressure of the fluid introduced through inlet port 26. In the central part of plate 13, there are also three openings 31 making it possible to discharge the fluid used for keeping the shaft within the bearing and which is introduced through ports such as 26.

Perpendicular to plate 13, it is also possible to see plate 19 having at one of its ends the two distribution chambers 22 and 24, to which reference was made hereinbefore in connection with FIG. 2, and at its other end two other chambers 32, 34. The partly broken away portion of FIG. 3 shows the fluid inlet 36 for introducing fluid into chamber 34, said inlet being provided with a pressure regulating screw 38. Like all the other distribution chambers of the device, chamber 34 has a pressure inlet 40. The central part of plate 19 has three openings 41 for discharging the fluid.

Each distribution chamber has a fluid inlet with an individual regulating screw and an individual pressure inlet, which makes it possible to regulate the pressure of the fluid at the start in order to precisely adjust the position of the shaft in its bearing.

The apparatus functions in the following way. The interposing of a pressurized fluid film between the shaft and the plate such as 13 and 19 makes it possible, in per se known manner, to keep the latter within the bearing and ensure its guidance without friction with the walls of the bearing. If there is an accidental variation in the angular position of the shaft relative to the bearing, e.g. if shaft 8 undergoes a slight rotation in the direction of arrow $F_1$ in FIG. 3 in such a way that part of face 12 of the shaft moves towards distribution chamber 22 and the other part moves away from distribution chamber 24, there is an increase in the pressure in the vicinity of chamber 22 and a decrease in the pressure in the vicinity of chamber 24. The same phenomenon occurs level with the plate (not shown in the drawing), which is positioned facing plate 19 and is identical thereto. Thus, a torque is produced and is exerted on face 12 and the opposite face of the shaft, thereby bringing the latter into its initial position (rotation in the direction of arrow $F_2$). Thus, once all the intake pressures are regulated, the device makes it possible to maintain the shaft automatically in the desired angular position. Before putting into use, the pressure is regulated to the desired value in each distribution chamber by means of regulating screws such as 38 and the pressure inlet such as 40. This makes it possible to initially place the shaft exactly in the desired position relative to the bearing. Then, during the operating phase, as the pressure remains constant in each distribution chamber, said position is automatically kept constant by the aforementioned mechanism.

The embodiment described hereinbefore applies to a shaft with a square cross-section, but it is obvious that the fluid guide bearing according to the invention can be used for guiding any random shaft having a polygonal cross-section or a random cross-section provided that it has at least one planar face parallel to its generatrixes. For example, in the case of a shaft with a rectangular cross-section, the distribution chambers such as 22 and 24 would be positioned facing the face of the shaft corresponding to the length of the rectangle. In the case of a shaft with a hexagonal cross-section, a plate with two distribution chambers like plate 19 and a plate with a single distribution chamber like plate 13 could be arranged in alternating manner along the faces of the shaft. The number and arrangement of the distribution chambers on the plates of the device can be of a random nature, provided that at least one of the plates has, facing a planar face of the shaft, two distribution chambers located on either side of the plane of symmetry of said face.

Thus, the device according to the invention has particularly interesting advantages, because not only does it make it possible to easily and rapidly vary the angular position of the shaft by means of the bearing and rotation means associated therewith, but also maintains the shaft automatically and constantly in the desired position relative to the bearing throughout the operations. This possibility did not exist with the prior art devices in which the shaft was guided by rails or cylindrical bars parallel to the shaft. The angular position of the latter was imposed once and for all and the installations were more complex and had larger overall dimensions (and consequently were more expensive), due to the presence of guide bars and connection means between the shaft and the bars. On a trial basis, a bearing according to the invention was constructed for guiding a shaft with a square cross-section of side length 40 mm and having plates of total length 240 mm. It was possible to reach speeds of approximately 4 to 5 m/s without vibrations, the fluid used being pressurized water.

The invention is obviously not limited to the embodiments described and represented herein and numerous variants are possible thereto without passing beyond the scope of the invention. Thus, the number and positioning of the distribution chambers and the fluid discharge openings in the plates, together with the shape of the latter could be chosen as a function of the particular case. The invention is applicable to all cases where it is desired to obtain a rectilinear displacement with a minimum resistance to sliding, the movement being controlled in an angular manner. The device can be used in air or immersed in a liquid of the same type as that used for supplying the guide bearings.

What is claimed is:

1. A device for handling a load by means of a shaft having a polygonal cross-section, said device comprising translation means for translating the shaft along its axis and said translation means comprising a fluid guide bearing immersed in a liquid and connected to rotation means, wherein the shaft has at least two parallel planar faces and said bearing has, facing each of the two aforementioned faces, a first and a second group of two distribution chambers into each of which issues a pressurized fluid intake, each of the latter being provided with an individual pressure regulating facility, the first group being spaced from the second group along the axis of the shaft and the two groups being mechanically interconnected, so that a rotation of the bearing about the axis of the shaft leads to an identical rotation of the latter.

2. A device according to claim 1 wherein the supply fluid for the fluid guide bearing is the liquid in which said fluid guide bearing is immersed.

3. An apparatus for controlling fuel rods, said apparatus comprising a control device in front of which a fuel rod can travel, said fuel rod being mounted at one end of a shaft having a polygonal cross-section, said shaft being maintained by a fluid guide bearing, wherein the shaft has at least two parallel planar faces and said bearing has, facing each of the two aforementioned faces, a first and a second group of two distribution chambers into each of which issues a pressurized fluid intake, each of the latter being provided with an individual pressure regulating facility, the first group being spaced from the second group along the axis of the shaft and the two groups being mechanically interconnected.

* * * * *